(12) United States Patent
Del Marmol

(10) Patent No.: US 7,500,682 B1
(45) Date of Patent: Mar. 10, 2009

(54) ADJUSTABLE HANDCART

(76) Inventor: Adolfo Del Marmol, 4104 Ventura Ave., Miami, FL (US) 33133

( * ) Notice: Subject to any disclaimer, the term of this patent is extended or adjusted under 35 U.S.C. 154(b) by 461 days.

(21) Appl. No.: 11/352,971

(22) Filed: Feb. 13, 2006

(51) Int. Cl.
*B68B 3/02* (2006.01)
(52) U.S. Cl. ...................................... 280/47.2; 414/490
(58) Field of Classification Search .................. 74/503, 74/813 L, 89.19, 104; 292/35, 254, 57; 414/490; 280/36 R, 79.5, 47.2, 47.28
See application file for complete search history.

(56) References Cited

U.S. PATENT DOCUMENTS

| | | | | | |
|---|---|---|---|---|---|
| 627,284 | A | * | 6/1899 | Walker | 280/47.2 |
| 820,274 | A | * | 5/1906 | Watley | 280/47.2 |
| 3,064,989 | A | * | 11/1962 | Bellows | 280/641 |
| 3,124,328 | A | * | 3/1964 | Kortsch | 248/118 |
| 3,578,353 | A | * | 5/1971 | Lockhart | 280/47.2 |
| 4,258,826 | A | * | 3/1981 | Murray | 182/20 |
| 5,540,606 | A | * | 7/1996 | Strayhorn | 440/63 |
| 6,588,775 | B2 | * | 7/2003 | Malone, Jr. | 280/47.18 |
| 6,616,173 | B2 | * | 9/2003 | Jenkins | 280/651 |
| 6,929,443 | B1 | * | 8/2005 | Nellis | 414/449 |
| 7,083,174 | B2 | * | 8/2006 | Kane | 280/47.2 |
| 7,309,203 | B2 | * | 12/2007 | Clark et al. | 414/736 |

* cited by examiner

*Primary Examiner*—Charles A Fox
(74) *Attorney, Agent, or Firm*—Sanchelima & Associates, P.A.

(57) ABSTRACT

A handcart having two wheel assemblies rotably mounted to a fixed axle and two adjustable secondary wheel assemblies rotably mounted to the distal ends of two parallel and spaced apart legs pivotally mounted at their other ends to the handcart frame members. The plate is mounted to a fixed location on the frame and the pivoting legs include elongated slots that receive inwardly extending pivoting axles perpendicularly mounted to the pivoting legs. The pivoting legs are releasably adjusted at one of a plurality of angular positions with a positioning mechanism on each of the pivoting legs that includes a curved plate with indentations.

3 Claims, 3 Drawing Sheets

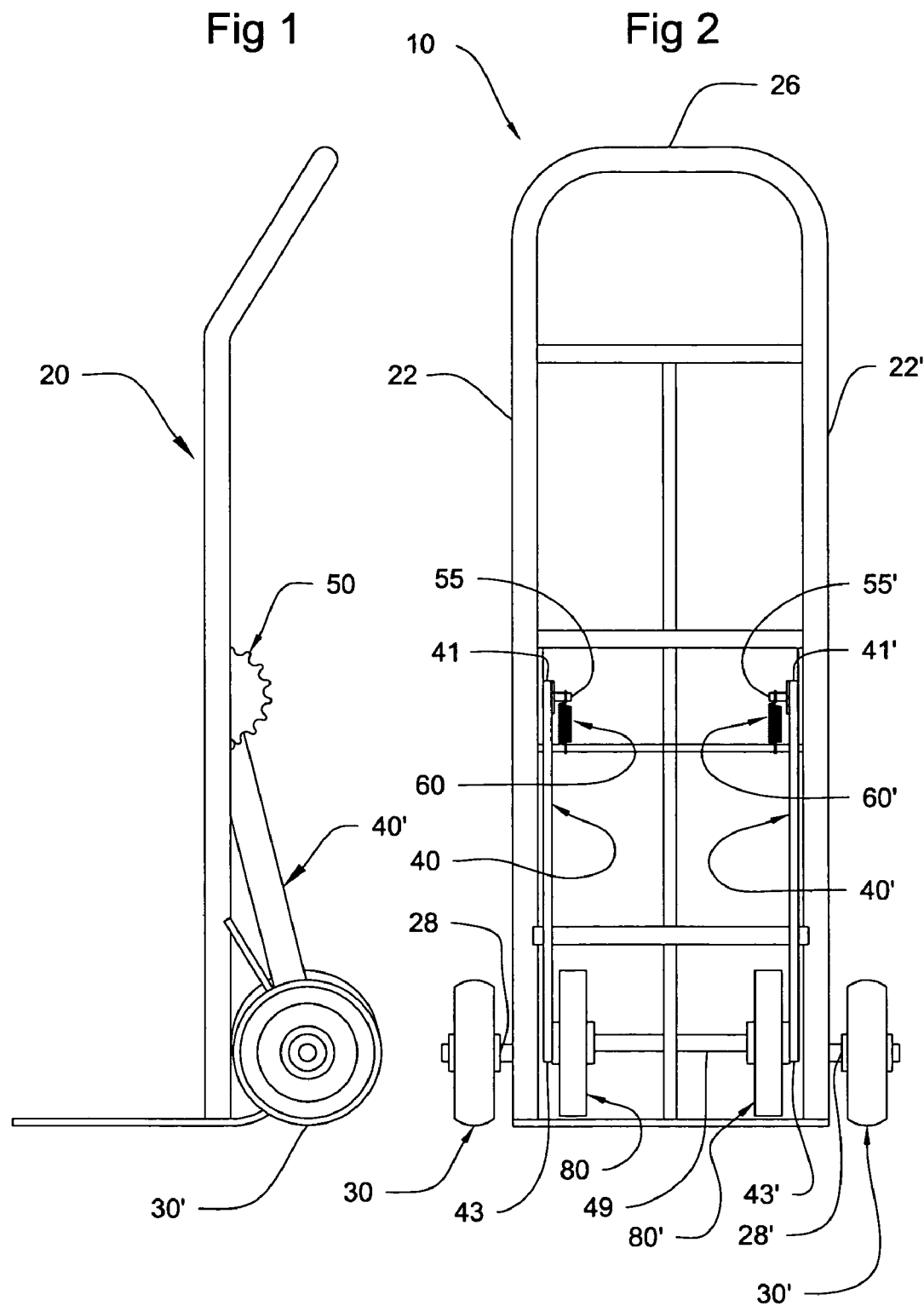

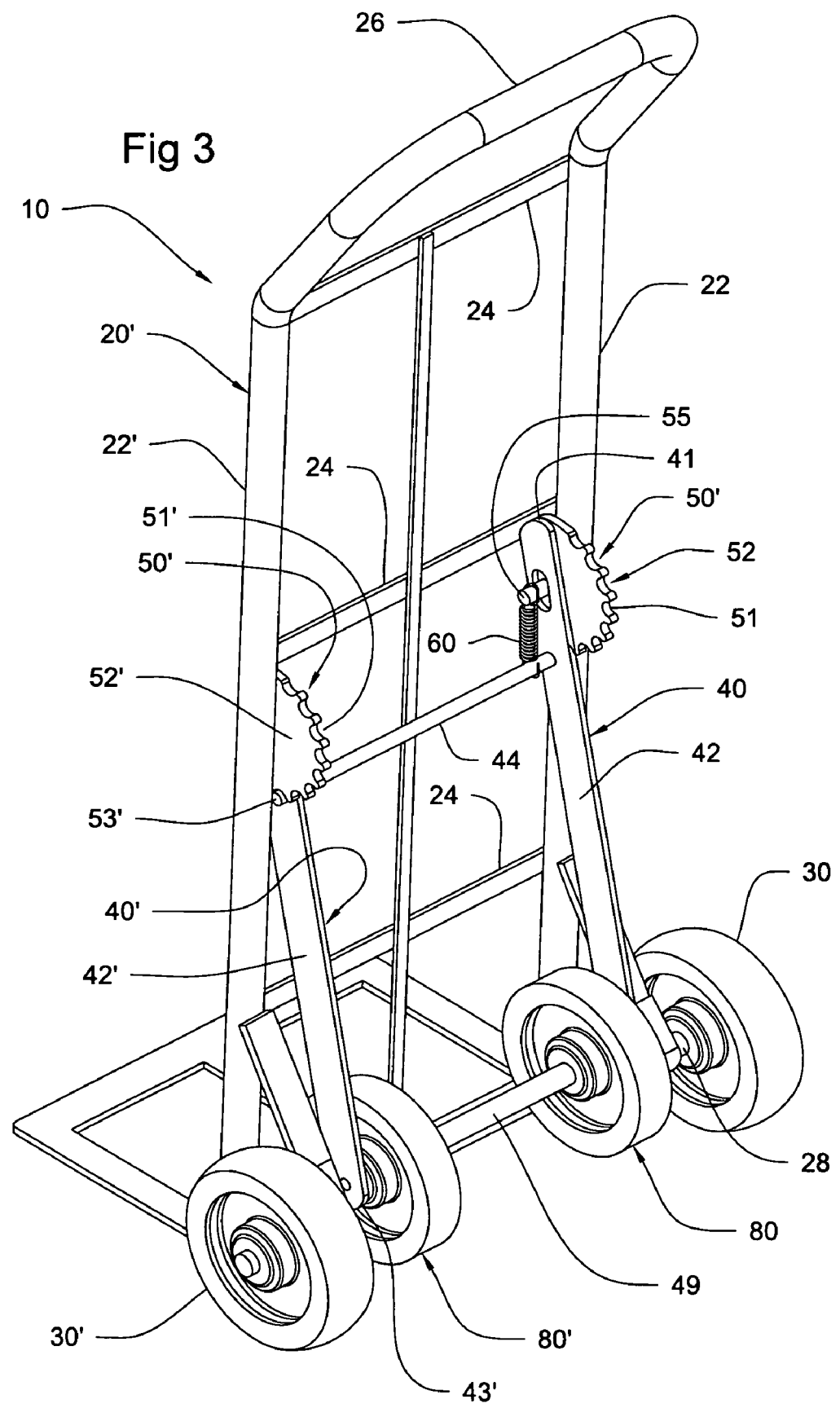

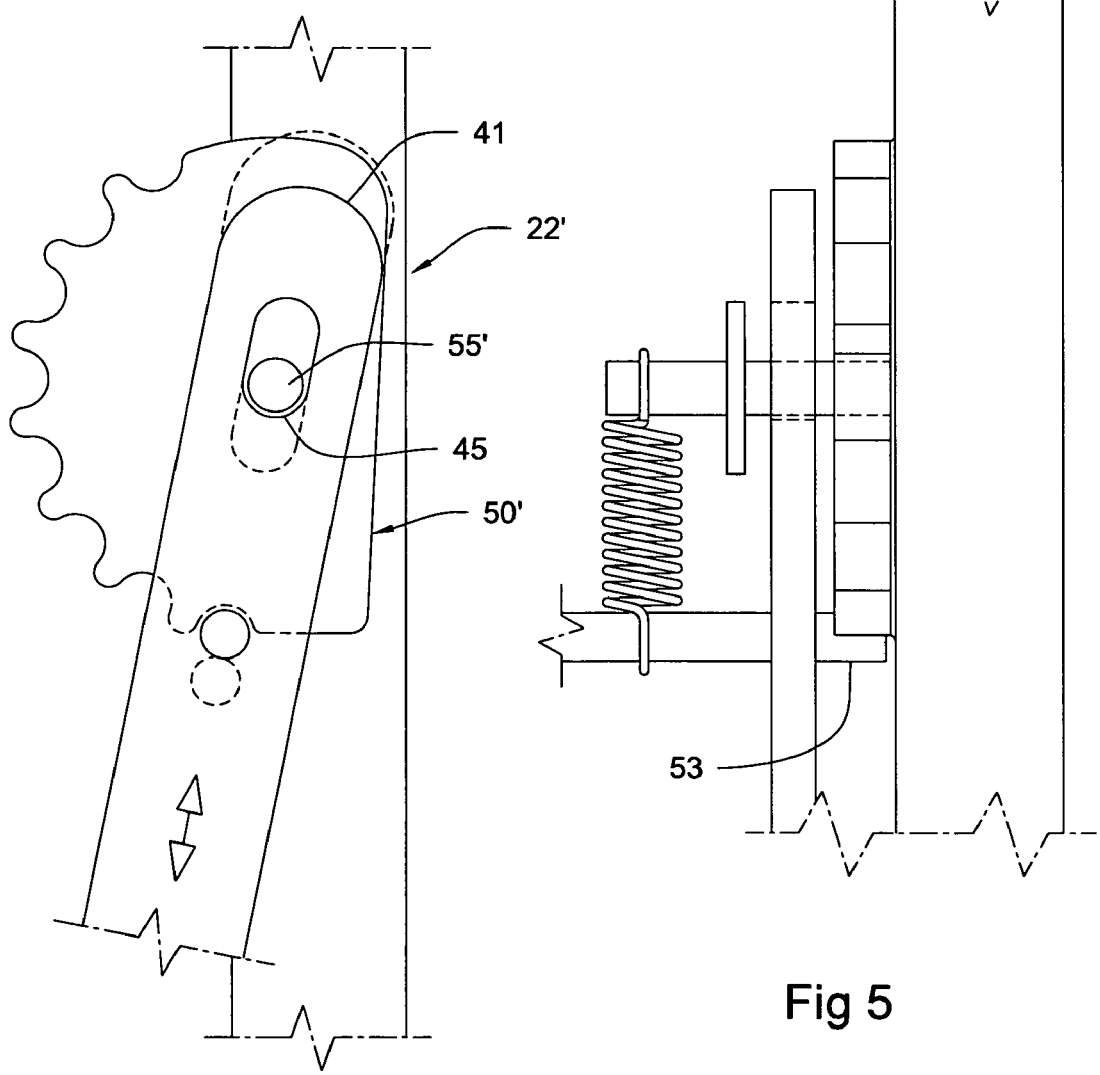

ADJUSTABLE HANDCART

BACKGROUND OF THE INVENTION

Field of the Invention

The present invention relates to an adjustable handcart. Several designs have been created in the past for handcarts and hand trucks of different or with different features. One of the related references corresponds to U.S. Pat. No. 679,750 issued to Hoffman in 1901. The patented truck includes an adjustable mechanism for locating another set of wheels away from the main set of wheels. However, different from the present invention is that Hoffman's device does not have the spring action and stopper pin combination for readily selecting one of different positions. A user can, with one hand and one foot, readily position the secondary wheel assembly. This is a valuable feature for those who use these devices regularly.

SUMMARY OF THE INVENTION

One of the main objectives of the present invention is to provide a simple handcart that can be readily manipulated and operated by a user with one hand, and, one foot. Another object of the present invention is to provide a handcart that can be readily adjusted to different stable angular positions with respect to a horizontal plane.

Another object of this invention is to provide a handcart that can readily overcome curbs and other differences in the supporting plane by selectively changing the position of the secondary wheels.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a side elevation view of the handcart for the present invention.

FIG. 2 is an elevation front view of the handcart for the present invention.

FIG. 3 is an isometric view of the handcart for the present application.

FIG. 4 is an enlarged detailed illustration of a portion of the adjustment mechanism of the present invention with the pivoting leg shown in broken lines for the retracted position.

FIG. 5 is a front view of a portion of the adjustment mechanism for the present invention.

DETAILED DESCRIPTION OF THE PREFERRED EMBODIMENT

Referring now to the drawings, where the present invention is generally referred to with numeral 10, it can be seen that it basically comprises cart frame assembly 20 including wheel assemblies 30 and 30', pivoting leg assemblies 40 and 40' including wheel assemblies 80 and 80' and positioning mechanisms 50 and 50' for adjusting and keeping pivoting leg assemblies 40 and 40' at an angle with respect to cart frame assembly 20.

Frame assembly 20 is implemented with a conventional hand cart that includes two wheel assemblies 30 and 30' mounted through axles 28 and 28', as best seen in FIG. 2. Assembly 20 includes elongated bars 22 and 22', as best seen in FIG. 3, that extend at a parallel and spaced apart relationship with respect to each other. Bracing members 24 keep bars 22 and 22' rigidly in a spaced apart relationship with respect to each other. Handle bar 26 joins the two distal ends of bars 22 and 22' at an ergonometrically convenient angle.

As seen in FIG. 3, pivoting leg assemblies 40 and 40' includes pivoting leg members 42 and 42', respectively, that are kept at a parallel and spaced apart relationship with respect to each other with spacer member 44, at ends 41 and 41', and actuating pedal axle 49 mounted at a distance from the other ends 43 and 43' of members 42 and 42', respectively.

As best seen in FIG. 4, member 42 includes a longitudinally extending slot 45 (the slot in member 42' is not shown but it is similar to slot 45) that cooperatively receives pivot axle 55 (and 55'). Pivoting leg assembly 40 pivots about pivot axles 55 (and 55') with some movement along longitudinal slot 45. Wheel assemblies 80 and 80' are rotably mounted to actuating pedal axle 49 which is rigidly mounted to the ends 43 and 43' of leg members 42 and 42'.

Spring assemblies 60 and 60' bias spacer member 44 towards pivot axle pins 55 and 55' urging leg members 42 and 42' to move upwardly towards handle bar 26. Stopper pins 53 and 53' butt against curved plates 52 and 52' that is part of positioning mechanism 50. Indentations or cutouts 51 and 51' on the curved periphery of plates 52 and 52' lodge stopper pins 53 and 53', respectively. Stopper pins 53 and 53' are perpendicularly mounted to leg members 42 and 42' extending outwardly therefrom.

To operate, a user holds handle bar 26 with one hand while applying force downwardly on actuating pedal axle 49 to overcome to tension of spring assemblies 60 and 60'. Stopper pins 53 and 53' are thus dislodged from indentations or cutouts 51 and 51', respectively, permitting the rotation of pivoting leg assemblies 40 and 40'. Once the desired angular position of pivoting leg assemblies 40 and 40' is reached, the user releases the force applied to actuating pedal 49 allowing pins 53 and 53' to be cooperatively lodged within the pertinent indentations 51 and 51', respectively. Cart 10 is then kept at a stable angle with respect to the bearing surface.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

The invention claimed is:

1. A handcart, comprising:
   A) first and second elongated bars and each having first and second ends kept at a parallel and spaced apart relationship with respect to each other by first and second spacer members that are parallel and separated from each other, and including a first pair of parallel and spaced apart wheel assemblies rotably mounted over first and second axles that are in turn outwardly mounted to said first ends and said first and second elongated bars further including first and second inwardly extending pivoting axles, respectively, at a first predetermined distance from said first ends;
   B) third and fourth elongated bars, each having first and second ends, said first ends of said third and fourth elongated bars being pivotally mounted to said pivoting axles, said third and fourth elongated bars each including a slot extending a second predetermined longitudinal distance and positioned at a third predetermined distance from said first ends of said third and fourth elongated bars, and each of said third and fourth elongated bar members also including an outwardly and perpendicularly mounted stopper pin at a fourth predetermined distance from said first ends of said third and fourth elongated bars and further including a third spacer member mounted between said third and fourth elongated bar members at a fourth predetermined distance from said first ends of said third and fourth elongated bars a second pair of parallel and spaced apart wheel assemblies rotably mounted over a third axle that in turn is mounted to said second ends of said third and fourth elongated bars;

C) means for selectively adjusting the angular position of said third and fourth elongated bars with respect to said first and second elongated bars, further including first and second curved plates mounted to said first and second elongated bars at said pivoting point and each of said first and second curved plates having a plurality of peripheral indentations that cooperatively coact to receive said pins substantially within said indentations positioned at a predetermined radial distance from said pivoting point; and D) spring means mounted between said pivoting axles and said third spacer member producing a force for urging said third and fourth bar members to lodge said stopper pins within one of said cooperating indentations of each curved plate, thereby keeping said third and fourth bars at a selected angular relationship with respect to said first and second bars.

2. The handcart set forth in claim 1 wherein the length of said slots is approximately twice the diameter of said pins.

3. The handcart set forth in claim 2 wherein the force of said spring means is overcome upon the application of a force of a predetermined magnitude upon said third axle thereby selectively dislodging said stopper pins from said cooperating indentations.

* * * * *